(12) United States Patent
Fernando et al.

(10) Patent No.: US 9,630,207 B2
(45) Date of Patent: *Apr. 25, 2017

(54) FLEXIBLE PIPE BODY AND METHOD OF PRODUCING SAME

(71) Applicant: GE Oil & Gas UK Limited, Nailsea, Bristol (GB)

(72) Inventors: Upul Shanthilal Fernando, Sheffield (GB); Neville Dodds, Newcastle-upon-Tyne (GB); Geoffrey Stephen Graham, Newcastle-upon-Tyne (GB); Michelle Davidson, Ryton (GB); Peter Kirton, Newton Aycliffe (GB); Philip Nott, Gateshead (GB); Andrew Thompson, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 122 days.

This patent is subject to a terminal disclaimer.

(21) Appl. No.: 13/862,043

(22) Filed: Apr. 12, 2013

(65) Prior Publication Data

US 2013/0276931 A1    Oct. 24, 2013

(30) Foreign Application Priority Data

Apr. 19, 2012    (EP) .................................... 12164837

(51) Int. Cl.
*B29C 71/00*    (2006.01)
*F16L 11/12*    (2006.01)
(Continued)

(52) U.S. Cl.
CPC .......... *B05D 3/007* (2013.01); *B29C 47/0023* (2013.01); *B29C 47/0064* (2013.01);
(Continued)

(58) Field of Classification Search
CPC .................................................. B29C 71/0009
(Continued)

(56) References Cited

U.S. PATENT DOCUMENTS 2,397,340 A * 3/1946 Dahle ..................... B29C 67/00
156/1
2,565,316 A * 8/1951 Glennard ............. B29C 61/003
156/308.4
(Continued)

FOREIGN PATENT DOCUMENTS

AU    B-68992/94    3/1994
AU    672508 B2    10/1996
(Continued)

OTHER PUBLICATIONS

Search Report from the European Patent Office for corresponding European Application No. EP12164837.2-2307, Sep. 17, 2012, 9 pages.
(Continued)

*Primary Examiner* — Atul P. Khare
(74) *Attorney, Agent, or Firm* — Klarquist Sparkman, LLP

(57) ABSTRACT

A flexible pipe body and methods of producing a flexible pipe body are disclosed. The method may include providing a tubular length of polymeric material for forming a polymeric layer of flexible pipe body; providing a strength layer radially outwards of the polymeric layer; and treating the polymeric layer with a non-ambient temperature and pressure.

14 Claims, 3 Drawing Sheets

(51) Int. Cl.
| | |
|---|---|
| B05D 3/00 | (2006.01) |
| B29C 47/00 | (2006.01) |
| C08J 7/12 | (2006.01) |
| F16L 11/08 | (2006.01) |
| F16L 53/00 | (2006.01) |
| B29C 47/02 | (2006.01) |
| B29C 47/06 | (2006.01) |
| C08J 7/02 | (2006.01) |
| F16L 11/04 | (2006.01) |
| B29K 27/00 | (2006.01) |
| B29K 305/12 | (2006.01) |
| B29L 23/00 | (2006.01) |

(52) U.S. Cl.
CPC .......... *B29C 47/021* (2013.01); *B29C 47/061* (2013.01); *B29C 47/065* (2013.01); *B29C 71/0009* (2013.01); *C08J 7/02* (2013.01); *C08J 7/12* (2013.01); *F16L 11/04* (2013.01); *F16L 11/08* (2013.01); *F16L 11/081* (2013.01); *F16L 11/082* (2013.01); *F16L 11/12* (2013.01); *F16L 53/002* (2013.01); *B29K 2027/16* (2013.01); *B29K 2305/12* (2013.01); *B29L 2023/22* (2013.01); *F16L 2011/047* (2013.01)

(58) Field of Classification Search
USPC .................................................. 264/341, 343
See application file for complete search history.

(56) References Cited

U.S. PATENT DOCUMENTS

| | | | |
|---|---|---|---|
| 2,814,313 A | | 11/1957 | Holbrook |
| 2,925,624 A | * | 2/1960 | Stahl et al. ................... 264/343 |
| 3,049,762 A | * | 8/1962 | Jackson ........................ 156/149 |
| 3,684,553 A | * | 8/1972 | Van Dyk .................. B05D 3/10 216/75 |
| 4,302,418 A | * | 11/1981 | Cullis ....................... B05D 3/10 264/341 |
| 4,343,672 A | | 8/1982 | Kanao |
| 4,727,909 A | * | 3/1988 | Griffiths ........................ 138/127 |
| 4,764,320 A | * | 8/1988 | Chau .................. B01D 67/0027 210/500.4 |
| 5,514,312 A | * | 5/1996 | Hardy et al. ................. 264/40.3 |
| 5,516,480 A | * | 5/1996 | Krall et al. ................... 264/343 |
| 5,645,109 A | * | 7/1997 | Herrero ................ F16L 11/082 138/130 |
| 5,671,778 A | * | 9/1997 | Sakuragi ............. B29C 63/0013 138/125 |
| 5,918,641 A | * | 7/1999 | Hardy et al. ................. 138/132 |
| 5,934,335 A | * | 8/1999 | Hardy ........................... 138/131 |
| 6,145,546 A | * | 11/2000 | Hardy .................... F16L 11/083 138/129 |
| 6,214,283 B1 | * | 4/2001 | Visscher et al. .............. 264/558 |
| 6,241,840 B1 | | 6/2001 | Pratt et al. |
| 6,368,526 B1 | | 4/2002 | Bango, Jr. |
| 6,454,897 B1 | * | 9/2002 | Morand ................... 156/244.13 |
| 6,506,333 B1 | | 1/2003 | Qin et al. |
| 6,726,863 B2 | * | 4/2004 | van Lenthe et al. ........ 264/40.7 |
| 7,445,030 B2 | * | 11/2008 | Hardy ................... F16L 11/083 138/129 |
| 7,770,603 B2 | * | 8/2010 | Hardy ........................... 138/134 |
| 8,721,948 B2 | * | 5/2014 | Sano et al. ..................... 264/234 |
| 2005/0229991 A1 | * | 10/2005 | Hardy ................... F16L 11/083 138/127 |
| 2006/0175062 A1 | | 8/2006 | Benson |
| 2008/0193688 A1 | | 8/2008 | Krah |
| 2008/0283138 A1 | | 11/2008 | Rytter |
| 2009/0000683 A1 | * | 1/2009 | Sheldrake ............. F16L 11/083 138/129 |
| 2009/0169790 A1 | | 7/2009 | Nadeau et al. |
| 2010/0084037 A1 | | 4/2010 | Ericsson et al. |
| 2010/0219555 A1 | | 9/2010 | Mehan |
| 2011/0192485 A1 | | 8/2011 | Graham |

FOREIGN PATENT DOCUMENTS

| | | |
|---|---|---|
| CN | 1277101 A | 12/2000 |
| CN | 1439838 A | 9/2003 |
| CN | 102216375 A | 10/2011 |
| CN | 102245953 A | 11/2011 |
| EP | 1027550 A1 | 8/2000 |
| EP | 1232849 A2 | 8/2002 |
| FR | 2268614 A * | 12/1975 |
| GB | 861556 A | 2/1961 |
| GB | 863105 A | 3/1961 |
| WO | 9634733 A1 | 11/1996 |
| WO | WO2009/087348 A1 | 7/2009 |

OTHER PUBLICATIONS

Third Party Observation from the European Patent Office, for Patent Application No. EP20120164837, dated Dec. 16, 2014, 3 pages.
"Communication—European Search Report" from the European Patent Office for European Application No. EP12164837.2-1706, dated May 28, 2015, 5 pages.
Jifang, "Mechanical Behavior and Optimum Design of Ocean Flexible Pipes Based on the Laboratory Tests and Numerical Simulations", Chinese Master's Theses Full-text Database Engineering Science and Technology I, 14 pages, Oct. 31, 2009.
European Search Report and Opinion issued in connection with related EP Application No. 12189971.0 on Jun. 24, 2013.
Australian Office Action issued in connection with related AU Application No. 2013205311 on Jan. 15, 2015.
US Non-Final Office Action issued in connection with related U.S. Appl. No. 13/862,276 on Jun. 18, 2015.
US Final Office Action issued in connection with related U.S. Appl. No. 13/862,276 on Dec. 22, 2015.
Unofficial English translation of Chinese Office Action issued in connection with related CN Application No. 201310139063.0 on Mar. 21, 2016.
US Non-Final Office Action issued in connection with related U.S. Appl. No. 13/862,276 on Mar. 24, 2016.
Unofficial English translation of Office Action issued in connection with corresponding CN Application No. 201310136395.3 on Apr. 5, 2016.
European Search Report and Opinion issued in connection with corresponding EP Application No. 12164837.2 on May 3, 2016.
European Search Report and Opinion issued in connection with corresponding EP Application No. 16154060.4 on May 18, 2016.

* cited by examiner

FLEXIBLE PIPE BODY AND METHOD OF PRODUCING SAME

CROSS REFERENCE TO RELATED APPLICATION

The present application claims the benefit of and priority to European Application No. EP12164837.2, filed on Apr. 19, 2012, which is incorporated herein by reference.

FIELD

The present invention relates to a flexible pipe body and method of producing the same. In particular, but not exclusively, the present invention relates to the use of polymers including thermoplastic materials for forming one or more layer of flexible pipe body, and a method of treatment to enhance the characteristics of the polymer.

BACKGROUND AND SUMMARY

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for on-shore (overland) applications.

In flexible pipes there are often used polymer layers, such as PVDF (polyvinylidene fluoride), that may be formed by extrusion. Most polymers will have a certain maximum allowable strain above which the risk of damage to the material is much greater. In flexible pipes where a polymer layer lies adjacent an armour layer (such as a polymer barrier layer adjacent a metallic pressure armour layer), the polymer layer may be subjected to quite severe non-uniform, highly localised strain. This is because the armour layer is usually formed from interlocking wires of certain cross section, and there are certain gaps between adjacent windings. The polymer layer tends to deform and creep into the gaps when under pressure.

In accordance with industry regulations, all flexible pipe structures must undergo a factory acceptance test (FAT) prior to sale. This involves pressurising a pipe bore with a fluid such as water at 1.5 times the usual pressure of use. The water is thus a pressurising medium.

The application of internal pressure (i.e. pressure from within the bore) to the pipe produces radial expansion in all layers and this is when a polymer layer undergoes deformation and tends to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

According to a first aspect of the present invention there is provided a method of producing a flexible pipe body, comprising: providing a tubular length of polymeric material for forming a polymeric layer of flexible pipe body; providing a strength layer radially outwards of the polymeric layer; and treating the polymeric layer with a non-ambient temperature and pressure.

According to a second aspect of the present invention there is provided a method of producing a flexible pipe body, comprising: providing a tubular length of polymeric material for forming a polymeric layer of flexible pipe body; providing a strength layer radially outwards of the polymeric layer; and treating a surface of the polymeric layer with a chemical to thereby change one or more physical property of the layer.

According to a third aspect of the present invention there is provided a flexible pipe body formed by a process comprising: providing a tubular length of polymeric material for forming a polymeric layer of flexible pipe body; providing a strength layer radially outwards of the polymeric layer; and treating the polymeric layer with a non-ambient temperature and pressure.

According to a fourth aspect of the present invention there is provided a flexible pipe body formed by a process comprising: providing a tubular length of polymeric material for forming a polymeric layer of flexible pipe body; providing a strength layer radially outwards of the polymeric layer; and treating a surface of the polymeric layer with a chemical to thereby change one or more physical property of the layer.

According to a fifth aspect of the present invention there is provided a method substantially as herein described with reference to the drawings.

According to a sixth aspect of the present invention there is provided a flexible pipe body substantially as herein described with reference to the drawings.

Certain embodiments of the invention provide the advantage that a flexible pipe body is provided that has been treated to reduce, inhibit or completely prevent microcrazing.

Certain embodiments of the invention provide the advantage that a method of treating a flexible pipe body is provided in which fluid may be used firstly to treat the pipe body to reduce, inhibit or prevent microcrazing, and then reused in a factory acceptance test.

The foregoing and other objects, features, and advantages of the invention will become more apparent from the following detailed description, which proceeds with reference to the accompanying figures.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

Figure 1:
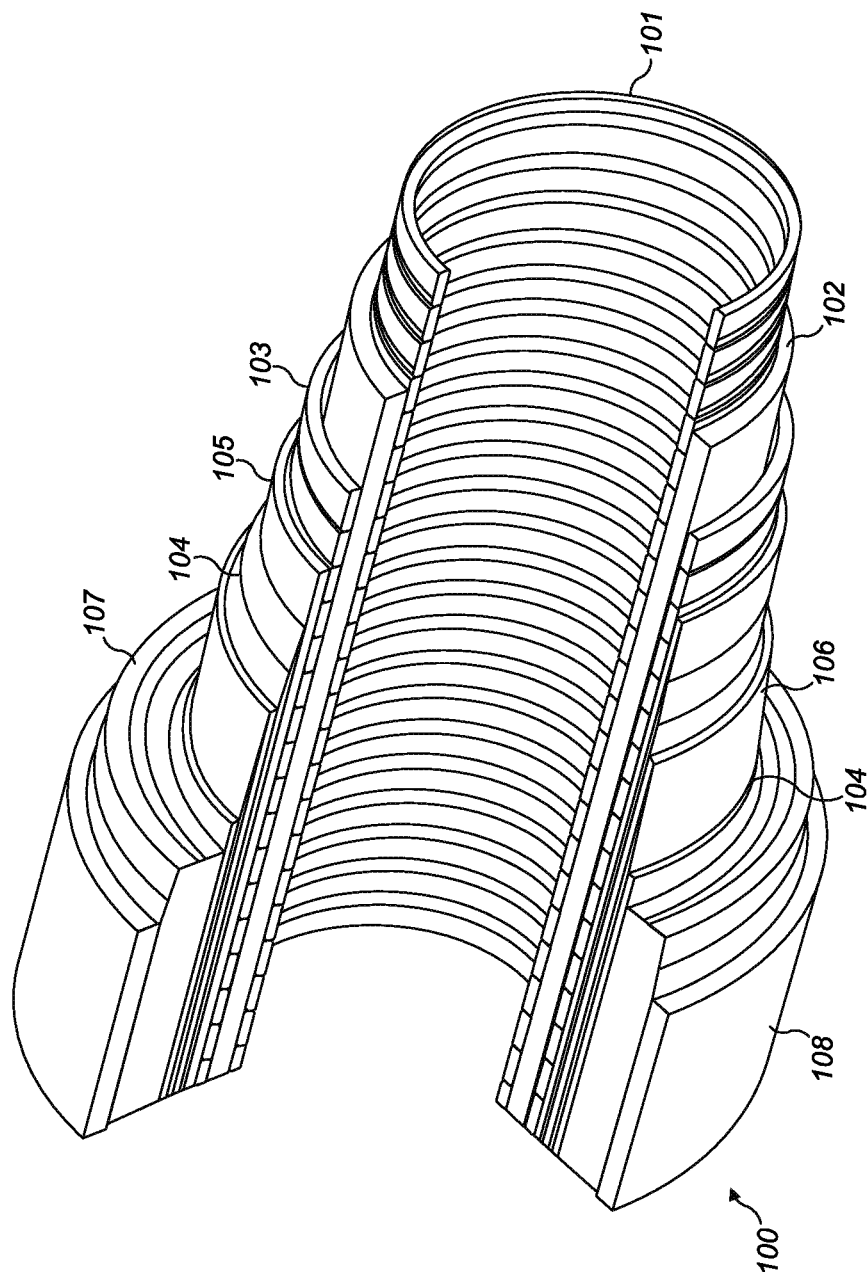
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which contain underlying layers and may act as a sacrificial wear layer to help prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
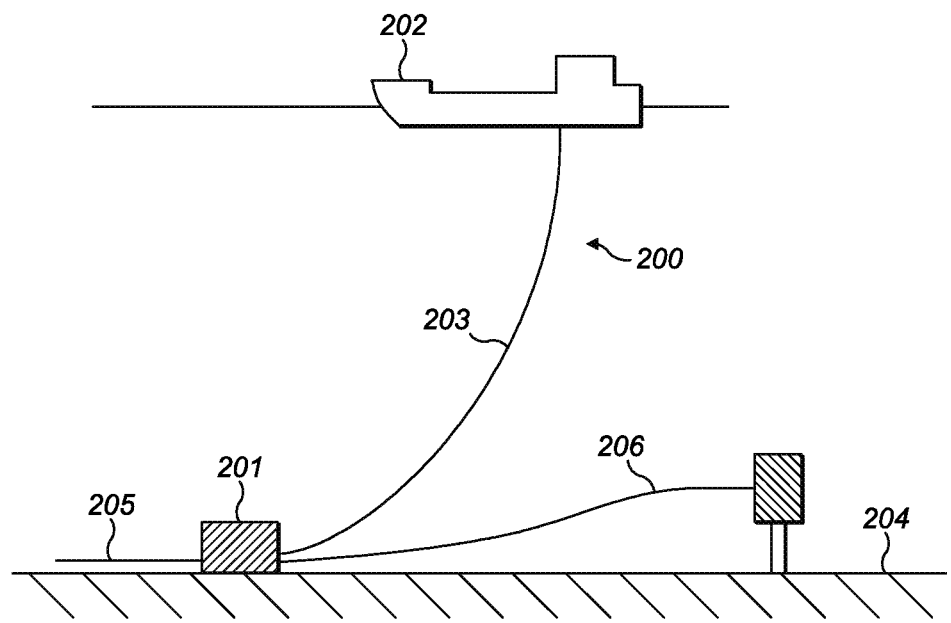
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
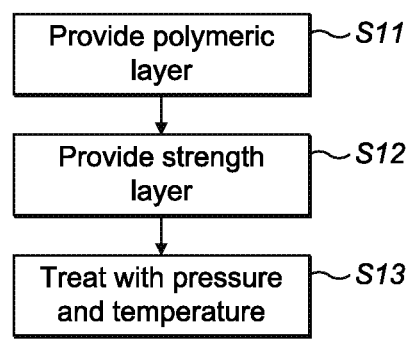
FIG. 3 illustrates a method of providing a flexible pipe body.

FIG. 3 illustrates an embodiment of the invention in which a flexible pipe body is manufactured. In a first step S11 a tubular length of polymeric material is provided for forming a polymeric layer of the flexible pipe body. In this example, the polymeric material is PVDF as a liner of the pipe body, and is provided by extrusion onto a mandrel in a known manner.

In a second step S12 a strength layer, which in this case is a pressure armour layer, is provided over the liner. The pressure armour layer is formed from an elongate strip of carbon steel having a generally Z-shaped cross-sectional profile. The strip is formed from a wire rolling process to have corresponding male and female connector portions such that as the strip is wound over the polymeric layer adjacent windings interlock.

Figure 4:
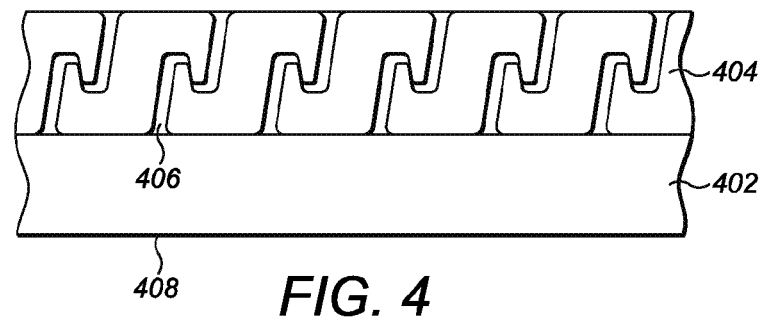
FIG. 4 illustrates a cross section of flexible pipe body.

A cross section of the polymeric layer 402 and the strength layer 404 is shown in FIG. 4.

In a third step S13, a treatment stage is undertaken whereby the polymeric layer is treated with pressure and heat. Heated water is used to pressurise the bore of the pipe body, i.e. flushed into and held within the pipe body, and held at pressure. The pipe body is therefore subject to internal pressurisation. The heat from the heated water will conduct to the polymeric layer and heat the polymeric layer.

Figure 5:
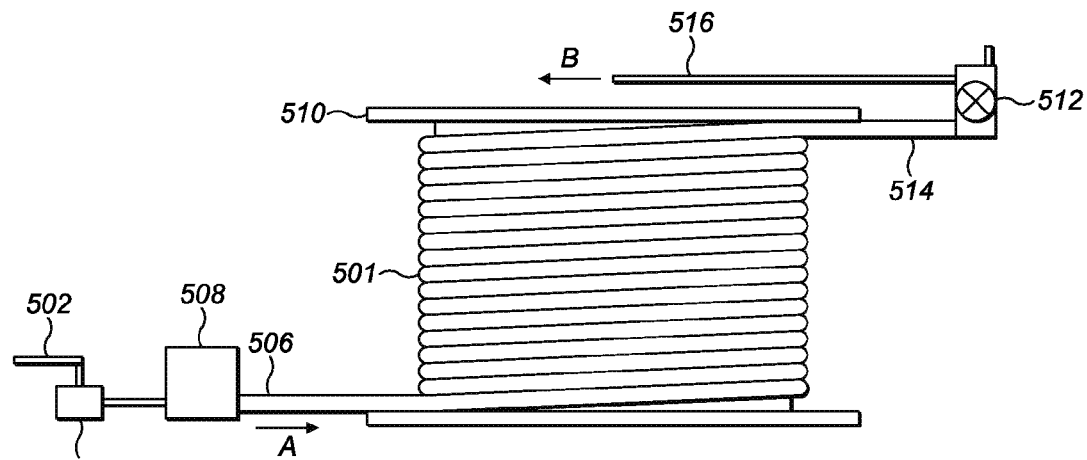
FIG. 5 illustrates apparatus for treating flexible pipe body.

FIG. 5 illustrates the treatment stage in more detail. A fluid inlet conduit 502 is connected to a heater 504. Water enters the heater 504 and is heated to about 40 degrees in this example. The water then exits the heater and is directed into a first end 506 of flexible pipe body 501 via a pump member 508 (in the direction of arrow A). The pipe body 501 is conveniently stored on a reel 510 whilst undergoing the treatment stage. The heated water is pumped through the pipeline and the pipeline is vented via a vent 512 to remove air from the system. Water exiting the second end 514 of the pipe body is re-circulated back to the heater (in the direction of arrow B via a conduit 516, partly shown) until the temperature throughout the system stabilises at the predetermined temperature of about 40 degrees. Then, the second end 514 of the pipe body is closed off via a valve and the pipe body 501 is pressurised using the pump 508 to a predetermined pressure of 55 MPa and held at that pressure for 2 hours.

Subsequent to the treatment stage, the valve may be reopened to reduce the pressure in the pipe body 501 back to ambient, the water cooled to ambient temperature, and the same water used to perform a Factory Acceptance Test on the pipe body by pressurising the pipe body to a predetermined pressure. That is, the treatment stage may be immediately followed by a FAT and the same set up and same fluid used for both stages. Alternatively, the FAT may be performed at a separate later stage. The pipe body may be emptied of water, cut down into shorter lengths and the separate lengths then re-terminated and subject to a FAT.

The method of FIG. 3 effectively provides a controlled pressurisation and deformation of the polymeric layer, without damage to the polymeric layer. The polymeric layer is somewhat softened by the heat; there will be a thermal gradient across the width of the layer. The combination of the softening of the material with the application of pressure causes the polymeric material to move into a closer relationship with the strength layer, plastically and permanently moving into any gaps 406 that are present between the windings of the strength layer.

It has been found that the urging of the polymer into the gaps under certain specified temperature helps the polymer to flow partially into the gaps, without cavitation and under a relatively low stress. Once the polymer has moved to the desired amount into the gaps, as a result of the treatment stage, the polymer remains in that position, re-hardening after the temperature is removed.

With the above-described invention, it has been found that surprisingly, areas 408 of the polymeric layer, which may have been subject to high localised strain under high pressure (from the FAT or in use) in known pipe arrangements due to the proximity to gaps 406, are not subject to such high strain in further use. That is, even when the pipe body undergoes high pressure in a FAT or use, the strain levels are not as high as other known arrangements. This has proved to significantly reduce or completely prevent any microcrazing in the polymeric layer during its future use after the treatment stage, including during a FAT and use in transporting production fluids.

Various modifications to the detailed arrangements as described above are possible. For example, the polymeric layer may be any layer of the pipe body and is not limited to the liner or barrier layer. The strength layer may similarly be any layer of the flexible pipe body such as a pressure armour layer, a tensile armour layer, etc. The polymeric layer need not be directly adjacent to the strength layer; there may be intermediate layers such as a sacrificial tape layer. For flexible pipe body with more than one polymeric layer, the method described above may be employed more than once so as to treat each of the polymeric layers in turn or concurrently. The treatment stage may be performed on a barrier layer with a carcass layer present, since a carcass layer is not fluid-tight and will allow pressurised fluid to flow therebetween to access the polymeric barrier layer.

The strength layer may not be a carbon steel wire as described above but may be made from a stainless steel strip, a reinforced polymer composite material or other such suitable material, and of any suitable cross section.

The temperature, pressure, hold time and processing fluid used for the treatment stage may be chosen according to the particular flexible pipe body materials, design, and future FAT test pressure. The polymeric layer may be a fluoropolymer such as PVDF, a polyamide such as PA-12, another material such as polyphenylene sulphide (PPS), or a combination thereof, and may have additional components such as metallic wires or nanoparticles dispersed therein.

Aptly, the temperature used in the treatment stage is between about 30 and 100 degrees C. The temperature may be between 30 and 90 degrees C., or 30 and 80 degrees C., or 30 and 70 degrees C., or 30 and 60 degrees C., or 30 and 50 degrees C., or 30 and 40 degrees C., for example.

Aptly, the pressure used in the treatment stage is between about 10 MPa and 350 MPa. The pressure may be between 50 and 300 MPa, or 50 and 250 MPa, or more aptly 50 and 200 MPa, or 50 and 150 MPa, or 50 and 100 MPa, for example.

Aptly the duration of the treatment stage when pressure and temperature are applied may be between 2 minutes and 24 hours, or 5 minutes and 6 hours, or 5 minutes and 4 hours, or 30 minutes and 3 hours, for example.

Although the description above refers to the use of heated water to pressurise a pipe body, other fluids can be used. For example steam, oil, or glycol or a mix of glycol and water may be used in the method described above.

Rather than a heater to provide fluid at a predetermined temperature, heated fluid may be provided from a storage unit with an independent or separate heating system, for example.

Alternatively, fluid may be provided into a flexible pipe body at ambient temperature, and then the complete system may be heated from the outside to a uniform predetermined temperature, and then the internal fluid pressurised.

Rather than perform the treatment stage with the pipe body in a wound (curved) configuration on a reel, the treatment stage may alternatively be performed on the pipe body whilst in a substantially straight configuration, or any other configuration.

Figure 6:
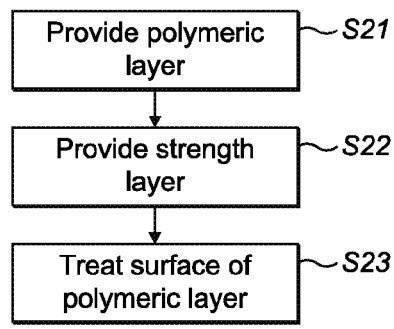
FIG. 6 illustrates another method of providing a flexible pipe.

FIG. 6 illustrates another embodiment of the invention in which a flexible pipe body is manufactured. In a first step S21 a tubular length of polymeric material is provided for forming a polymeric layer of the flexible pipe body. In this example, the polymeric material is PVDF as a liner of the pipe body, and is provided by extrusion onto a mandrel in a known manner.

In a second step S22 a strength layer, which in this case is a pressure armour layer, is provided over the liner. The pressure armour layer is formed from an elongate strip of carbon steel having a generally Z-shaped cross-sectional profile. The strip is formed from a wire rolling process to have corresponding male and female connector portions such that as the strip is wound over the polymeric layer adjacent windings interlock.

A cross section of the polymeric layer 402 and the strength layer 404 is generally as shown in FIG. 4.

In a third step S33, a treatment stage is undertaken whereby the polymeric layer is treated with a chemical. More specifically, the radially inner surface of the polymeric layer is soaked with a chemical so as to change at least one physical property of the layer.

An example of the treatment stage S33 will now be described. An apparatus similar to that shown in FIG. 5 may be used for the chemical treatment stage. However, a heater is not necessary in this example (though may optionally be used).

A fluid inlet conduit is connected to a first end of flexible pipe body via a pump member. The pipe body is conveniently stored on a reel whilst undergoing the treatment stage. Acetone is then pumped through the pipe body. Acetone exiting the second end of the pipe body may re-circulated back to the first end of the pipe body. This acetone flushing is continued for up to 2 hours.

Subsequent to the treatment stage, the pipe body may then undergo the usual Factory Acceptance Test by pressurising the pipe body to a predetermined pressure, immediately or separately. The pipe body may be cut down into shorter lengths and the separate lengths then subject to a FAT. The polymeric layer may only expand into the gaps of the strength layer at the time of the FAT. However, the chemical treatment to the inner surface is sufficient to reduce strain and therefore microcrazing of the layer.

The method of FIG. 6 effectively provides a treatment stage in which the radially inner surface of the polymeric layer is exposed to acetone for the predetermined time length. The exposure causes a change in the stiffness of a portion of the polymeric layer at the radially inner side, without detrimental degradation of the polymeric layer. The chemical acts as a semi-solvent, which has the effect to softening the polymer without dissolving the polymer.

It has been found that the treatment of the radially inner portion of the polymeric layer surprisingly has the effect of reducing or preventing microcrazing in the polymeric layer during later pressurisation of the flexible pipe body. The treatment is applied in a controlled manner so as to only affect a portion at the radially inner surface of the polymeric layer. This change to the molecular structure of the surface of the polymeric layer is sufficient to prevent microcrazing even though the radially outer portion of the layer (which is the portion that is pushed between gaps in an outer strength layer) is not treated. It is thought that the chemical treatment increases the elasticity and toughness of the polymer under pressure at the inner surface sufficiently to prevent initiation of microcrazing.

Various modifications to the detailed arrangement as described above are possible. For example, the polymeric layer may be any layer of the pipe body and is not limited to the liner or barrier layer. The strength layer may similarly be any layer of the flexible pipe body such as a pressure armour layer, a tensile armour layer, etc. The polymeric layer need not be directly adjacent the strength layer; there may be intermediate layers such as a sacrificial tape layer. For flexible pipe body with more than one polymeric layer, the method described above may be employed more than once so as to treat each of the polymeric layers in turn or concurrently. The treatment stage may be performed on a barrier layer with a carcass layer present, since a carcass layer is not fluid-tight and will allow pressurised fluid to flow therebetween to access the polymeric barrier layer.

The temperature, pressure, hold time and processing chemical used for the treatment stage may be chosen according to the particular flexible pipe body materials, design, and future FAT test pressure. The polymeric layer may be a fluoropolymer such as PVDF, a polyamide such as PA-12, another material such as polyphenylene sulphide (PPS), or a combination thereof, and may have additional components such as metallic wires or nanoparticles dispersed therein.

Although the temperature need not be raised for the treatment stage, in other embodiments heat could additionally be used, up to 100 degrees C. for example.

Although the chemical may be pumped or flushed through the pipe body sufficiently for the chemical to come into contact with the polymeric layer (substantially filling the pipe body bore), the pressure of the chemical may be raised, up to 350 MPa or a lower amount.

Aptly the duration of the treatment stage when chemical is applied may be between 2 minutes and 24 hours, or 5 minutes and 6 hours, or 5 minutes and 4 hours, or minutes and 3 hours, for example.

Although the description above refers to the use of acetone, many chemicals may be used so as to change a physical property of the polymeric layer. The chemical may be a hydrocarbon oil or fluid, a polar solvent (such as common alcohols), or non-polar solvents (for example benzene or toluene), or ionic or supercritical liquid solvents. The physical property may be one or more of shape, modulus of elasticity, stress-strain relationship, threshold strain for crazing, surface hardness, surface tension, friction for movement of polymer fibre chains, microstructure of polymer chain distribution, and density.

Rather than flushing or pumping a bore of a flexible pipe body with a chemical, the chemical may be sprayed onto the layer, applied in a transient manner such as by passing a slug of fluid between two pigs along the length of the pipe body, or applied in another manner, such as by spraying the outer surface of another adjacent layer, or by wrapping a doped tape (liquid capsuled tape) against the polymeric layer and applying pressure to burst the capsules. Alternatively the chemical could be used during the FAT test itself.

Although the above embodiment describes applying the chemical to the internal surface of the polymeric layer, alternatively or additionally, the outer surface of the polymeric layer may be treated.

The invention is not limited to the step orders shown in the flow diagrams of FIGS. 3 and 6.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of producing a flexible pipe body for sub-sea transporting of production fluids, the method comprising:
    forming a pipe body comprising an inner tubular thermoplastic layer and a strength layer lying radially outwards over a radially outer portion of the thermoplastic layer, the strength layer having gaps between adjacent windings thereof; and
    treating a radially inner surface of the thermoplastic layer with an organic solvent so as to increase elasticity of the thermoplastic layer only at the inner surface, said treating conducted by pumping the solvent through the pipe body so as to only contact the inner surface without dissolving polymer of the thermoplastic layer,
    wherein said treating reduces microcrazing in the thermoplastic layer that would otherwise result from internal pressurization of the pipe body causing the radially outer portion of the thermoplastic layer to push between said gaps.

2. A method as claimed in claim 1 wherein material of the thermoplastic layer is selected from the group consisting of PVDF, PA-12, PPS, or a combination thereof.

3. A method as claimed in claim 1 wherein the thermoplastic layer comprises a composite mix of polymer and another component.

4. A method as claimed in claim 1 wherein the solvent is selected from the group consisting of acetone, hydrocarbon oil or fluid, polar solvent, non-polar solvent, ionic solvent, and supercritical solvent.

5. A method as claimed in claim 1 wherein the solvent is acetone.

6. A method as claimed in claim 1 wherein said treating is carried out for around 2 minutes to around 24 hours.

7. A method as claimed in claim 1 wherein said treating is carried out for up to 2 hours.

8. A method as claimed in claim 1 wherein said pumping is carried out at a pressure up to 350 MPa.

9. A method as claimed in claim 1 wherein said pumping is carried out at a temperature up to 100° C.

10. A method as claimed in claim 1 wherein said treating changes one or more additional physical properties of the thermoplastic layer selected from the group consisting of shape, stress-strain relationship, threshold strain for crazing, surface hardness, surface tension, friction for movement of polymer fibre chains, microstructure of polymer chain distribution, and density.

11. A method as claimed in claim 1 wherein said treating softens polymer of the thermoplastic layer without dissolving the polymer of the thermoplastic layer.

12. A method as claimed in claim 1 wherein the increase in elasticity is accompanied by an increase in toughness.

13. A method as claimed in claim 1 wherein said treating completely prevents any microcrazing in the thermoplastic layer resulting from said application of internal pressure.

14. A method as claimed in claim 1 wherein the strength layer is an armour layer formed from interlocking wires having the gaps present between adjacent windings thereof.

* * * * *